April 18, 1944.  J. O. KLEBER  2,346,760
WAVE RECORD MOLD
Filed July 21, 1941  3 Sheets-Sheet 1

INVENTOR
JACKSON O. KLEBER
BY J. L. Hearing
ATTORNEY

April 18, 1944.   J. O. KLEBER   2,346,760
WAVE RECORD MOLD
Filed July 21, 1941   3 Sheets-Sheet 2
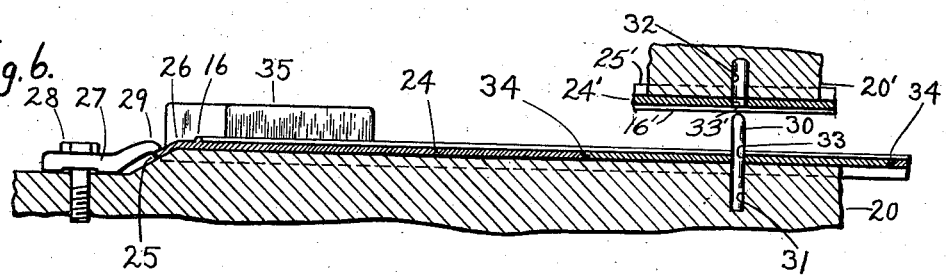
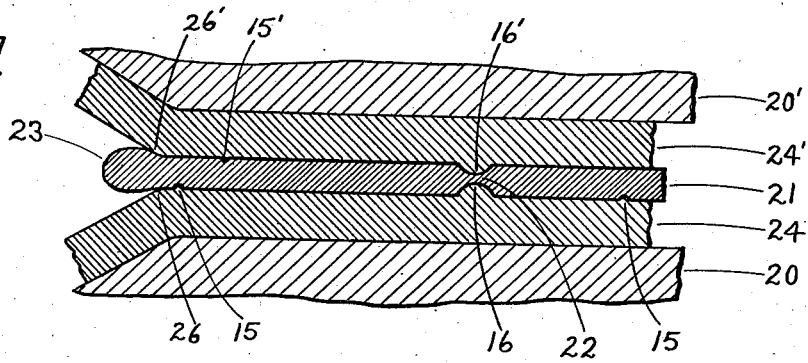
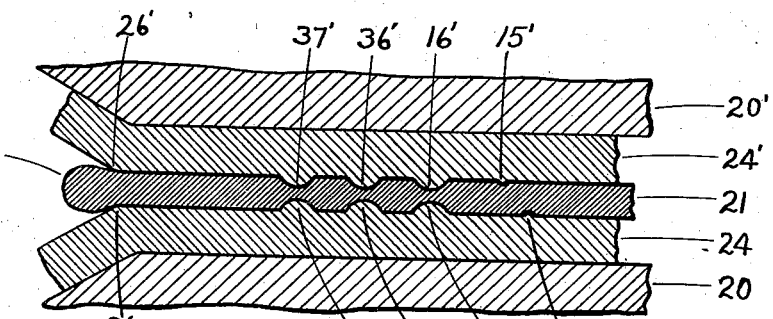
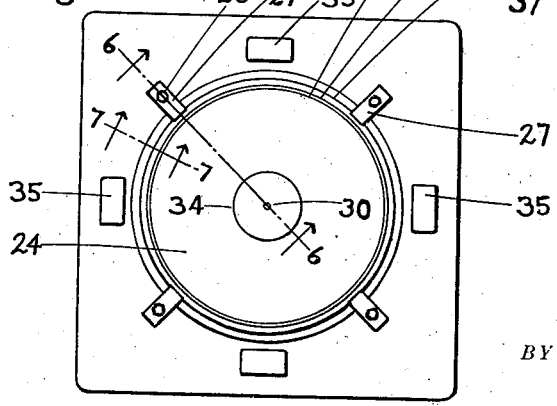
INVENTOR
JACKSON O. KLEBER
BY
J. L. Hearing
ATTORNEY April 18, 1944. J. O. KLEBER 2,346,760
WAVE RECORD MOLD
Filed July 21, 1941 3 Sheets-Sheet 3
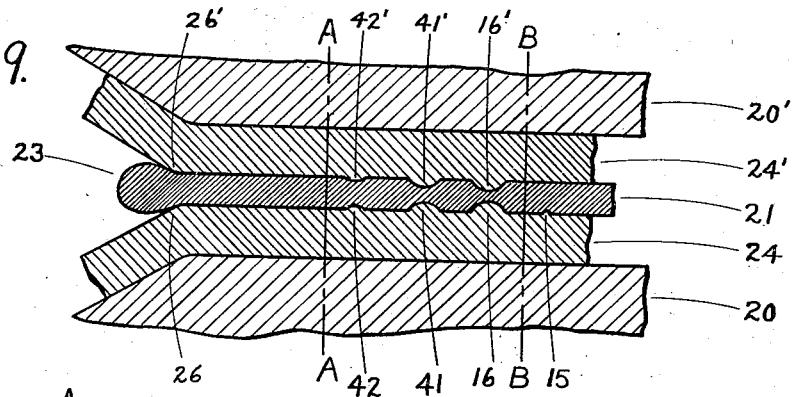
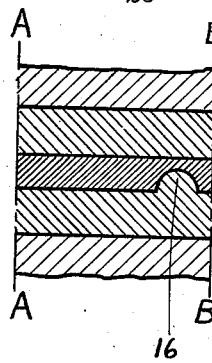
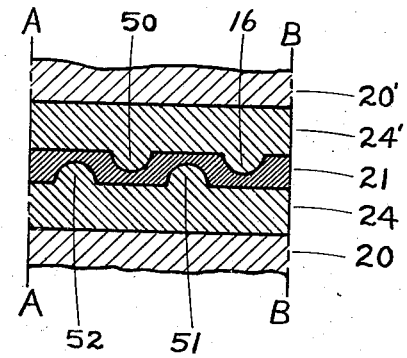
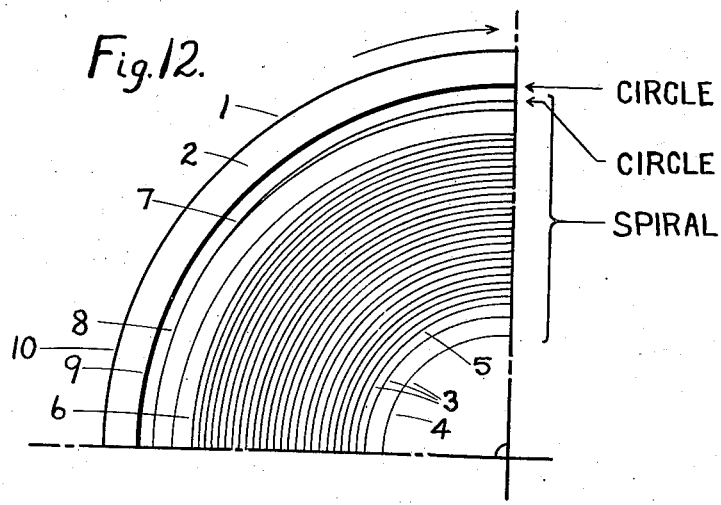
INVENTOR
BY JACKSON O. KLEBER
J.L.Hearing
ATTORNEY Patented Apr. 18, 1944

2,346,760

UNITED STATES PATENT OFFICE 2,346,760

WAVE RECORD MOLD

Jackson O. Kleber, Long Island City, N. Y.

Application July 21, 1941, Serial No. 403,346

3 Claims. (Cl. 18—5.3)

This invention relates to records of sound or other waves, and particularly to record molds adapted for use in producing thin disk record tablets, and to methods of making such molds and tablets.

A duplicate sound record is commonly made by pressing a piece of plastic material between an upper and a lower mold or stamper plate having a record track included in one or both of the stamper faces. At the rim of each of the two stamper faces, there is sometimes provided a ring of metal, separate from the stamper and having a continuous ridge projecting into the space between the stampers to reduce the thickness of the final plastic record disk at its edge and to aid in shaping the edge of the disk.

Another method of providing a metal ring for this purpose is to emboss a hill-like fold at the edge of each stamper plate to form a ridge as a continuous ring along the edge of the stamper. The stamper is usually made by plating metal, such as copper, on the treated surface of an original wax record, the ridge being embossed on the stamper after the sound track is produced therein.

Objectionable difficuties appear to be involved in an increasing degree with decrease of thickness of the record to be pressed, while utilizing the methods and devices referred to above, there apparently being an increasing tendency for the plastic material of the record tablet being pressed to pile up at one or more places and to develop objectionable irregularities in the surface and in the thickness of the tablet which interfere with or prevent intelligibility or the desired quality of reproduction of the original waves. At the same time, air pockets in increasing numbers are produced in the disk, especially in the border portions thereof, and tend to mutilate the record and produce noise and other difficulties during reproduction.

When the separate ring method is used, as referred to above, variations in the height of the ridge relatively to the face of the stamper and the use of stampers of slightly different thickness, make it necessary to consume much time in making difficult adjustments of level of the ridge, by shims or other expedients, relatively to the face of the stamper. It will be understood that slight departures from ideal dimensions are to be expected in the form of irregularities in both the ring and its support, and in general, may be positive in some places and negative in others, thus making the maximum difference between the added positive and added negative extremes give rise to a total discrepancy of at least four times that of an individual maximum irregularity.

When the edge of the stamper is embossed to fold it into a ridge, the forming operation permanently stretches portions of the stamper, thereby increasing the stiffness of the metal at the edge of the stamper in an irregular manner. Furthermore, when the force which folds the edge of the stamper is removed, the edge springs back slightly from its extreme deformed position to a slightly less folded condition which is somewhat irregular at different points along the fold, apparently due to variations in the stiffness of the material. The stamper is also distorted by a buckling force left in the material by the permanent stretching of the stamper edge during the embossing operations.

These irregularities in the stamper tend to accentuate the difficulties encountered in trying to press very thin records, since the irregularities in the effective height of the ridge become an increasingly greater percentage of the thickness of the record, as the record thickness decreases. Any irregular outward bulge of the stamper tends greatly to impede at irregular points, the radial outward flow of the plastic and to impede the escape of air pockets during the pressing operations.

A further difficulty with the embossed type of ridge, is that the ridge is so near the sound track in an economically full record that the embossing operation is likely to injure the track, especially when the track is very fine and the turns are very close together, which is a condition likely to exist with the use of very thin records for the purpose of compactness. A further limitation of the embossed fold or ridge, is that when the stamper plate is of suitable thickness, the minimum practical radius of curvature of the convex side of the fold is ordinarily greater than the thickness of the stamper, thus limiting the sharpness of definition of the edge of the record, and leaving considerable material to be removed from the record by a separate edge-finishing operation.

With either of the ridge forms referred to above, the thickness and width of the waste edge of the pressed tablet vary considerably, these variations sometimes causing breakage of the edge into pieces, thus making it difficult to strip off the waste edge cleanly in a single operation. In some cases, the variations of thickness or width of the waste edge may cause difficulties, either due to portions of the waste edge becoming prematurely severed from the main body of the tablet and starting cleavage along a line which may encroach on and mutilate the main record, or due to pieces of the waste edge falling away prematurely so that the resulting lack of exposed edge attached to the tablet, hampers removal of a freshly pressed tablet from the machine, or due to a tendency of debris from the waste edge to scatter undesirably in the vicinity of the pressing operation.

An object of the present invention is to provide a wave record mold and tablet, and method of making the same, which are convenient, simple, expeditious, efficient, and of low cost.

Another object is to improve the mounting, centering and securing of stamper plate molds in their proper relative pressing positions, and the removal of the molds from these positions.

Another object is to efficiently produce very thin pressed record tablets.

Another object is to overcome one or more of the above mentioned difficulties.

Another object is to reduce imperfections in a pressed record and to prevent objectionable noise in the sound reproduced therefrom, particularly when the record is very thin.

Another object is to equalize and control more efficiently than by prior methods and devices, the pressure and distribution of the plastic within the mold while pressing the tablet.

Another object is to press a record tablet in such form that the waste edge thereof has an efficient relation with the main body of the tablet and may be readily stripped therefrom, and that the edge of the main body is left relatively clean and free from imperfections after stripping the waste edge.

Another object is to provide a weakened severance line with improved uniformity between the waste edge of the tablet and the main body thereof, and to reduce the tendency for premature separation of a part of the removable edge from the tablet.

In accordance with one aspect of the present invention, a wave record mold is produced from a blank, such as a disk of wax or other suitable material, having a smooth flat circular face, two grooves being produced in the flat face, one groove being spirally directed, coaxial with the face, and containing a wave record in portions thereof, and the other groove being a circularly directed, equalizer defining groove, positioned radially outside of the record portions of the spiral, and having a predetermined depth which is greater than the average depth of the record portions of the spiral. The mold preferably, but not necessarily, has in its flat face, a border zone of a predetermined substantial width extending radially outward from the equalizer defining groove.

In a preferred form of the invention, a stamper plate mold, constituting a negative copy of the first mentioned mold, has a circular equalizer ridge, defined by the equalizer groove of its parent, for cooperating with a similar ridge on a companion stamper plate to aid in establishing and controlling a suitable fluid pressure within the plastic material from which the record tablet is pressed. The equalizer ridge on the respective stamper plates also produces a weakened severance line of dependably uniform strength between the waste border and central disk portions of the tablet. The mounting, centering and securing of stamper plate molds in their proper pressing positions and their removal from these positions, is simplified and expedited by producing a flange coaxial with the equalizer ridge by deflecting rearwardly from the mold face of the stamper plate a border portion of the plate radially outside the equalizer ridge.

The cooperation of the border zones and the equalizer ridges of the pair of companion stampers is such that it has been found practical to press very thin record tablets, as well as tablets of the more usual greater thickness. This cooperation makes it possible to press record tablets efficiently with a relatively high quality of impression of the wave record groove, without objectionable irregularities in the thickness of the tablet, and without surface imperfections tending objectionably to mutilate reproduction from the record or tending objectionably to increase the noise reproduced from the record. The cooperation of the zones and ridges of the pair of stampers also produces a border zone of uniform width and thickness in the resulting tablet for providing a convenient hand grip to facilitate removal of the tablet from the press and for holding together the extreme outer portions of the rim of variable thickness and width, which without such a zone, might tend prematurely to separate and shatter during or before the desired removal of the waste rim from the central disk.

By cutting the equalizer groove directly in the original record mold or a positive copy thereof, a substantial amount of time is saved and complication avoided in the various steps between an original recording and the final production of finished duplicate records, since such records require a high degree of freedom from irregularities in the mold dimensions. The method permits of readily producing any one of a variety of equalizer ridge shapes or combinations of two or more coaxial ridges of different radii, and of the same or different heights for controlling the pressure and distribution of the plastic within the stamper mold. If desired, an equalizer ridge on one stamper may be made high enough to take the place of an opposed ridge on the companion stamper, the area of the companion stamper directly opposite to the ridge on the first stamper, remaining flat without a ridge.

These and other objects and features of the invention will be understood more clearly from the following detailed description of the invention and the appended claims, in connection with the accompanying drawings.

In the drawings, Fig. 1 is a plan of one quadrant of a master mold disk, shown on a reduced, scale, but with the dimensions of the grooves and their spacings exaggerated to some extent to show their general arrangement more clearly, the direction of stylus feed in the case of a final record derived therefrom, being radially inward.

Fig. 5 is a plan on a reduced scale, of a preferred method of attaching a stamper plate to either the upper or lower element of a record pressing machine.

Fig. 6 is a vertical section of a part of the stamper plate arrangement of Fig. 5, taken on the radius 6—6, and on a larger scale than Fig. 5.

Fig. 7 is a vertical section on an enlarged scale, of a part of the Fig. 5 modification, taken on the radius 7—7, and showing two stamper plates with a record pressed between them.

Figs. 8 and 9 are vertical sections, similar to Fig. 7, but showing modifications of the stamper plate employing more than one equalizer ridge.

Figs. 10 and 11 are vertical sections of modifications of stamper plate combinations, showing a portion thereof which may be substituted between the vertical lines A—A and B—B, in Fig. 9.

Figure 1:
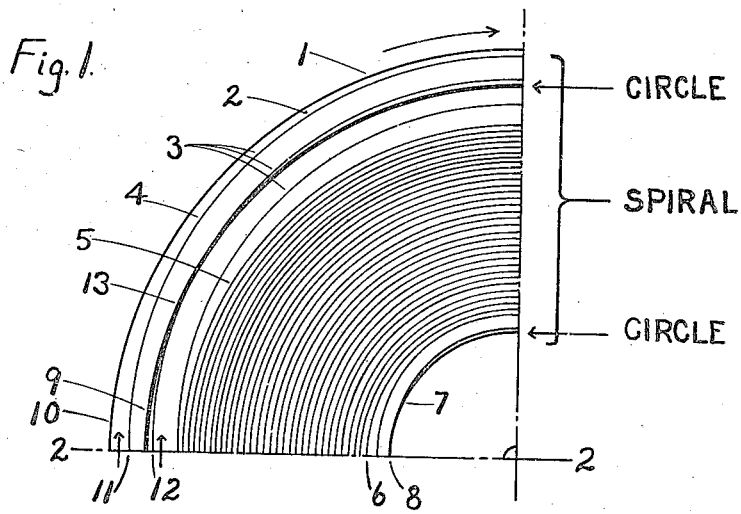

Fig. 12 is a plan of a mold, similar to that of Fig. 1, except that the direction of stylus feed in the case of a record derived therefrom, is radially outward Referring to Fig. 1. the original record mold or matrix blank 1 of wax or other suitable material for receiving a wave record, is usually of disk form, only one quadrant of the disk being shown in the drawings for purposes of simplification. During recording, mold 1 is supported on and coaxial with the turntable of a recording machine, not shown, the mold being provided throughout the entire extent of one side thereof with a smooth flat face 2 in which a stylus or other suitable tool, not shown, produces a spirally directed groove 3 by cutting or other suitable operation, while the blank 1 rotates in a clockwise direction, as indicated by the arrow. The groove 3 starts at a radially outer turn 4 and extends radially inward to the turn 5 with a coarse pitched spiral, serving in well known manner for starting purposes. At about turn 5, the spiral is changed to a fine pitch to economize record space, and continues fine up to about turn 6 where, for record stopping or other control purposes, the spiral is changed to a coarse pitch extending to the point 7 in turn 8 where the spiral groove ends and becomes a closed circle to limit movement of the pickup stylus radially inward on the final record tablet derived from the mold.

Sound or other waves to be recorded, are impressed in record form in the fine pitched portions of the spiral groove 3 between turns 5 and 6, as either vertical or lateral undulations in the groove. Either before or after, but preferably after producing the spiral groove 3, a circularly directed equalizer defining and severance line defining groove 9, of a greater depth than the average depth of the record containing portions of groove 3, is produced in a line radially outside of turns 5, 6, 7, 8, of groove 3. In the case of final records to be traced by a stylus feeding radially inward of the tablet, groove 9 is spaced at least a predetermined distance radially out from the outermost turn of the record containing portions of spiral 3, to provide a suitably large protecting space between the wave record turns and the edge of the final record disk to be derived from the mold. In some records, the width of this spacing may be as small as three-sixteenths of an inch, for example, but it will be understood that it may be much larger or smaller, and in any case is a matter of engineering determination, depending upon the class of service to be performed by the record. The position of groove 9 in the case of a final record wherein the stylus feed is radially outward of the record, is described in connection with Fig. 12 hereinafter.

The border zone between groove 9 and edge 10, hereinafter referred to as zone 9, 10, extending radially outward from groove 9, or radially inward from edge 10 at least a predetermined uniform distance, referred to in more detail hereinafter, is preferably provided in the flat face 2 of mold 1.

For convenience in referring to the location of various zones in the figures of the drawings, such zones will be designated in certain cases hereinafter, by referring to their boundaries, as in the case of zone 9, 10.

Figure 2:
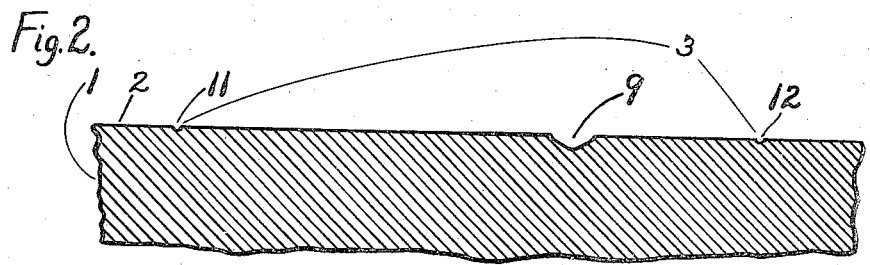
Fig. 2 is an enlarged vertical section of a fragment of the Fig. 1 mold, taken on the radius 2—2, and showing in section, the equalizer defining groove and one turn of the spiral groove at each side thereof.

In Fig. 2, the circularly directed equalizer defining groove 9 is shown between two adjacent turns 11 and 12 of the coarse pitched portion of the spiral groove 3, the groove 9 cutting across groove 3 at point 13, Fig. 1, between the turns 11, 12.

Figure 3:
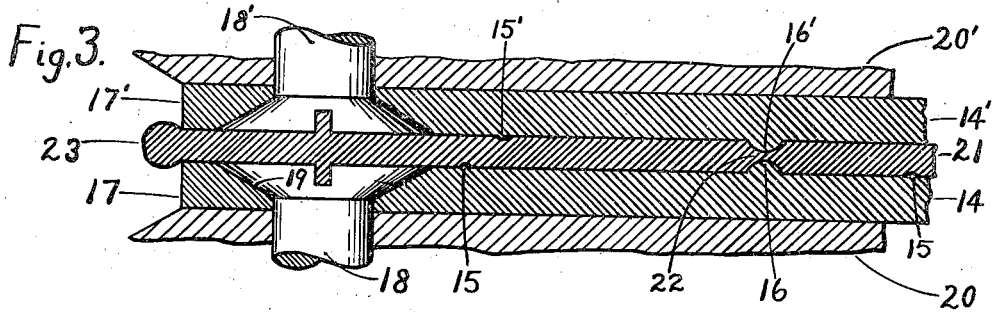
Fig. 3 is an enlarged vertical section of the outer part of a pair of companion stamper plates with a record pressed therebetween.

Fig. 3 shows in cross section, a stamper plate mold 14, having on the upper side thereof, a flat face including a negative copy of the record bearing face of an original mold similar to mold 1, the copy being made by any well known method, as by electrodeposition, in which method the record face of the original mold such as mold 1 is rendered electrically conducting and then plated with a metal, such as copper, until a suitable thickness of deposit is obtained, the metal deposit then being stripped from the original mold, and the back of the resulting plate being turned off in a lathe in well known manner, to produce a flat rear side face, parallel with the front side face containing the ridge-like fillet 15, as a negative molded copy of a spiral groove corresponding with groove 3, Fig. 1, and the ridge-like fillet 16, as a negative molded copy of an equalizer defining groove fillet corresponding with groove 9, Fig. 1.

It will be seen that in Fig. 2, the fillets in the form of grooves 3 and 9 are both on the same side of the plane of the flat face 2 of mold 1, and in Fig. 3, the fillets in the form of ridges 15 and 16 are also both on the same side of the plane of the flat face of stamper 14.

The cylindrical edge 17 of stamper plate 14, may be produced in a lathe cutting operation while rotating the plate coaxially with the circular equalizer ridge 16, thus defining the outer circular edge of the flat mold face of stamper 14 and making the border zone 16, 17 of the stamper of uniform width extending radially outward the desired predetermined distance from the ridge 16. It will be seen that the zone 9, 10 of mold 1 should be at least wide enough to define the stamper border zone 16, 17 together with any material at the outer edge thereof to be removed in the lathe operation of producing edge 17.

Figure 4:
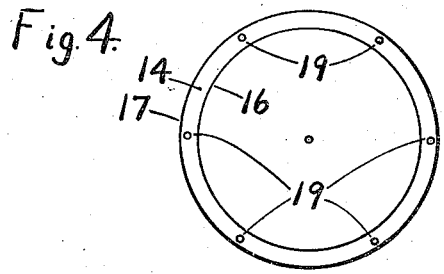
Fig. 4 is a plan on a reduced scale, showing the position of attachment screws around the border of the stamper plate of Fig. 3.

Screws or bolts 18, shown on an enlarged scale in Fig. 3, pass through holes 19 around the outer edge of stamper 14, the holes 19 being positioned close to the outer edge of zone 16, 17, as shown in Figs. 3 and 4, for securing the stamper to the lower pressing element 20 of a record tablet pressing machine, not shown in further detail.

The border zone 16, 17 is made wide enough to provide room for bolts 18 near the outer edge thereof with sufficient spacing between the inner edge 16 of the zone and the bolts to protect ridge 16 and the parts of the stamper face radially inside thereof from injury or dislocation by operation of the bolts.

A companion stamper plate 14', similar to stamper 14, is secured similarly to stamper 14, by screws 18' to the upper element 20' of the press. Plates 14, 14' have the same corresponding dimensions and are supported coaxially with each other, so that the equalizer ridges 16 and 16' of the same radius, respectively, and the border zones 14, 16, and 14', 16' of the same width, respectively, are coaxial with each other and are in exact superposition. The mold face of stamper 14 or 14' may contain, or may omit if desired, the spiral record-containing ridge 15 or 15', respectively.

Fig. 3 shows on a greatly enlarged scale, a fragment of a flat, parallel faced tablet 21, pressed from a plastic biscuit between stampers 14, 14', the plastic being a commercial product known as "vinylite," or may be any other suitable plastic record tablet material. The biscuit 21 which is usually initially of smaller size than the faces of stampers 14, 14', is ordinarily placed near the center of the space between the separated stampers. The stampers are raised to the proper temperature to impart the desired plasticity to the biscuit, so that as the mold faces of the stampers approach each other, the plastic material begins to flow radially outward, filling the entire cavity between the stampers and radially inside the equalizer ridges 16, 16'. It will be seen that the ridges 16, 16' form barriers of predetermined uniform height normal to the opposed parallel faces of the stampers and having an annular orifice 22 between them of highly uniform size throughout the length of the ridges 16, 16', the height of each ridge above the face of its respective stamper, being uniform to an extent not ordinarily attainable by other known practical methods of producing the stampers, the opening of orifice 22 being highly uniform, due to parallelism between the flat stamper faces and the method of directly defining the positions and the dimensions of ridges 16, 16' by the corresponding grooves in the respective faces of their parent molds.

The plastic 21, after emerging between equalizer ridges 16, 16', flows radially across the flat parallel zones 16, 17 and 16', 17' of stampers 14, 14', respectively, and fills the space therebetween, thus forming a corresponding flat border zone in the final tablet 21, the flat zone being of substantially uniform radial width and substantially uniform thickness, and having at its outer edge the irregular rough edge 23 of varying width and thickness, formed by the excess plastic material pressed out beyond the edges 17, 17'. It will be seen that the flat circular faces of the tablet 21 are coaxial and of the same diameter.

Figs. 5, 6 and 7 show a method of mounting the stamper plates, that is preferred in most cases over that of Figs. 3 and 4, one advantage among others being the simpler and more expeditious operation when mounting, centering and securing the stampers in their proper relative pressing positions, as well as when reversing these operations in removing the stampers from the press to permit the pressing of tablets from other molds. The circular outer edge 25 of stamper 24 is coaxial with ridge 16. The border zone 16, 25 of the stamper 24, is made wide enough to allow room for the frusto-conical flange 25, 26 to be provided therein coaxial with the ridges 15 and 16, and diverging rearwardly and directly from the mold face of the stamper, as for example by a pressing operation in which the flange is produced by deflecting the outer edge of the originally flat zone 25, 26, 16, rearwardly from the mold face of stamper 14. The inner edge 26 of the flange forms the circular outer edge of the finished flat face of mold 24 and is coaxial with the ridges 15 and 16, being spaced far enough from ridge 16 to prevent injury or dislocation of ridge 16 by the flange forming operation or the operation of clamping the stamper to the bed of the record press. It will be seen that for this and other purposes referred to herein, the border zone 25, 16, includes the flat inner annular portion 26, 16 of predetermined uniform width for defining a corresponding flat border zone of suitable width in the plastic tablet 21.

The concave side of stamper 24 is of the same shape as the frusto-conical bed 20 of the press and is held securely thereto by the clamps 27, equally distributed around the edge of the stamper. Each clamp 27 is bolted to the press 20 by a screw 28, the nose 29 of the clamp pressing the flange securely against the conical part of the bed 20. The pilot pin 30, held securely at its lower end in the tight fitting hole 31 of press 20, is in alignment with the slip fitting hole 32 in the upper press element 20'. Center holes 33, 33' in the companion stampers 24, 24', are coaxial with pin 30 and are a close slip fit therefor, for centering the stampers in cooperation with the flanges 25 and 25'.

It will be understood that stamper 24' which is only partly shown in Fig. 6, corresponds in shape with stamper 24, the press element 20' corresponding in shape with element 20, as indicated in Fig. 7, and the method of clamping the stampers to their respective elements being the same.

It will also be understood that, if desired, but not as a matter of necessity, the stampers 24, 24' in Fig. 6, or in any of the figures, may be sectionalized at their centers, by having a removable central section having an edge 34 radially inside the area corresponding with that occupied by the groove 3, Fig. 1, the edge 34 closely fitting a corresponding hole in the stamper.

The spacers or landing blocks 35, Figs. 5, 6, attached to element 20, are of such thickness as to limit the approach of stampers 24, 24', during the pressing operation to a predetermined spacing wherein the tablet 21 is of the desired thickness. Pilot pin 30 and corresponding holes 31, 32, 33, 33', and landing blocks 35, Figs. 5, 6, will also be used in connection with the stampers of the other figures of the drawings. After pressing tablet 21 to the proper thickness, the plastic is hardened by cooling the press elements 20, 20', in well known manner, and the tablet is then removed from the press.

As a result of the stamper dimensions already described, the width of the flat border zone 16, 17 of tablet 21, Fig. 3, and 16, 26, Fig. 5 and the other figures, is such as to provide several important advantages. One advantage is that the zone is of sufficient size to serve as a frame for holding together the extreme outer waste edge portions 23 of variable thickness and width which without a zone of adequate strength might tend prematurely to separate and shatter during or before the desired separation of waste edge 23 from the central disk portion of the tablet along the line 16. Another advantage is that the zone is of such size as to provide a convenient hand grip, so that a freshly pressed record tablet may be conveniently removed from the press in the limited space available for that purpose by grasping the zone without the necessity of touching the central record disk portion of the tablet, a related advantage being that of providing an element of suitable size and strength to be grasped or held while stripping the border zone from the central disk. A further advantage is that the border zone has a uniform strength of sufficient amount to prevent the starting of unwanted lines of cleavage, and to provide a positive contrast with the lesser strength of the weakened severance line 16, thereby improving the efficiency of desired separation along the severance line while permitting the severance line to have sufficient strength to perform its function of holding the parts together until the desired time of separation. It will be seen that these desirable relations and advantages are not possible when the border zone is omitted and the waste edge 23 is located directly in contact with line 16.

In Fig. 8, the circularly directed equalizer ridges 16, 36 and 37, of successively larger radius, respectively, and of equal height above the flat face of stamper 24, are radially outside of the record portions of spiral ridge 15, and are coaxial with and cooperate with corresponding ridges 16', 36' and 37', respectively, of the same respective dimensions on stamper 24', so that an annular orifice with a uniform opening is provided between each pair of superposed cooperating ridges 16, 16', and 36, 36', and 37, 37', respectively, the orifices being passed successively by the plastic as it flows radially outward between stampers 24, 24'. Ridges 36, 36' and 37, 37' supplement ridges 16, 16' as barriers to the flow of the plastic and in establishing a suitable pressure and stabilizing the same in the plastic radially inside of ridges 16, 16' and in controlling the outward flow of the plastic and entrained gas from said space.

In Fig. 9, the stampers 24, 24' are similar to stampers 24, 24' of Fig. 8, except that the pairs of equalizer ridges 16, 16', and 41, 41', and 42, 42', of successively greater radius, are successively of smaller dimension, respectively, normal to the plane of the stamper face, or in other words are successively of less height above the flat face of the stamper plate from which they project, so that they present successively weaker barriers to the radial outward flow of the plastic, and provide annular orifices therebetween, the combination of pairs of ridges providing a flaring throat with successively larger openings. The change of plastic pressure as the plastic passes the outermost pair of equalizer ridges 42, 42', is therefore less abrupt and susceptible to more gradual control than in the case of the stampers of Fig. 8.

It will be understood that the method of producing each of the equalizer ridges of Figs. 8 and 9, is the same as that described for producing the ridge 16 of Figs. 3 and 7, the parent mold being provided with a groove similar to the equalizer defining groove 9 of Fig. 1 for each of the desired ridges, the groove shape and depth, and the radius of its circular direction being in each case the same as that of the desired ridge.

In Fig. 10, the stamper 24 has an equalizer ridge 16 of approximately twice the height of ridge 16 of the previous figures, in order that the top of the ridge may be close enough to the flat unridged face of the superposed stamper 24', to provide a corresponding severance line 16 of the desired depth and a web of material at the weakened line 16 of the tablet having a thickness corresponding approximately with that of the tablet 21, Fig. 7. The Fig. 10 form of stamper is somewhat simpler than that of the previous figures, since only one equalizer defining groove needs to be made, and the orifice between ridge 16 and the face of stamper 24', is uniform without requiring so much exactness in making stampers 24, 24' coaxial, as in the case of stampers of the previous figures having superposed ridges 16, 16' of equal radii. The radius of the circular equalizer ridge 16 in Fig. 10, is less than the radius of the largest circular area containable in the flat face of the companion stamper 24', in order to make possible the proper superposition of the mold faces, furthermore when the border zone 16, 26 is provided, the flat faces of both stampers 24, 24' are of substantially larger radii than the ridge 16.

Fig. 11 shows the equalizer ridge 16 of the kind shown in Fig. 10, supplemented by another ridge 50 on the face of the upper stamper 24', the two upper ridges 16, 50 being nested coaxially between ridges 51, 52 on the face of the lower stamper 24, each of the ridges being of the same height and the ridges being successively of larger radius in the order 16, 51, 50, and 52, respectively, This combination of ridges distributes the resistance to the flow of the plastic or in other words, the pressure due to the barrier effect of the ridges, over a longer radial path than in the case of the single barrier ridge of Fig. 10, so that any desired graduated pressure control may be obtained. The combination obtains uniform spacing between each ridge and the face of the cooperating stamper without requiring that the ridges of one stamper be made as precisely coaxial with those of the other as in the case of stampers employing superposed ridges of the same radius, as in Fig. 3.

In Fig. 12, the blank 1 is similar to that of Fig. 1. The spiral groove 3 is started at a radially inner turn 4 and extended radially outward to the turn 5 with a coarse pitched starting spiral, the blank 1 rotating in a clockwise direction, as indicated by the arrow. At about turn 5, the turns are made fine pitched for containing the wave record efficiently, and continue fine to about the turn 6 where the pitch is made coarse for stopping or other control purposes, and is continued coarse to the point 7 in turn 8 where the spiral is ended and is changed to a closed circle to limit outward radial movement of the stylus in the case of a final record to be derived from the mold. The circularly directed equalizer defining groove 9 is produced coaxially with spiral 3, being spaced radially outside of turns 4 to 8 and at least a predetermined distance radially out from the nearest turn 8, this spacing being substantially the same as that between the turn 5 and groove 9 of Fig. 1. The border zone 9, 10 of Fig. 12 is substantially the same as that in Fig. 1. Stamper mold plates and record tablets may be derived from the mold of Fig. 12 by the same method as that described for derivation of stampers and tablets from the Fig. 1 mold.

Instead of pressing record tablets from stampers which are direct negative copies of the original wax mold, the procedure may be modified if desired, by using the negative copy of the wax mold as a parent from which to produce by well known methods of electrodeposition or by other methods, a positive copy of the wax mold to serve in turn as a parent from which to produce a number of duplicate negative copies of the original wax mold, each duplicate negative copy being then available for use as a stamper for pressing the final record tablets in duplicate. It will be seen that the method of producing the equalizer defining groove 9 in the mold of Figs. 1 or 12, lends itself readily to the production of any desired shape of equalizer ridge, as by merely providing a groove cutting tool, not shown, of the desired profile. Furthermore, any desired combination of two or more ridges may be provided for adjusting the pressure and controlling the flow of the plastic during the record pressing operation.

I have found that very thin record tablets may be pressed by the method and means disclosed herein, and that the invention is adapted to produce very compact recordings of sound or other waves, from which there may be derived any desired number of duplicate pressed record tablets capable of high quality of reproduction and without objectionable noise.

For one class of service, I have found that very satisfactory record tablets may be made from the commercial plastic known as Vinylite, the thickness in one case being about twenty-five thousandths (.025) to thirty thousandths (.030) of an inch, other records having been pressed satisfactorily with considerably less thickness as well as with much greater thicknesses. The spiral groove may be traced at the commercial low turntable speed of 33⅓ revolutions a minute, but it will be understood that satisfactory results may be obtained at somewhat lower speeds, as well as at any of the usual higher speeds. The fine pitched spiral grooves on the molds and the tablets may number as high as 150 to the radial inch or higher, or may have any desired lower number of turns to the inch. The record containing portions of the spiral groove in the case of a tablet twenty-nine thousandths (.029) of an inch thick, in one instance was about one or two thousandths (.001 or .002) of an inch deep, the equalizer defining groove being about eight or nine thousandths (.008 or .009) of an inch deep and about twenty-eight thousandths (.028) of an inch wide, the flat border zone of the tablet radially outside of the severance line, having a radial width of about one quarter of an inch. The thickness of the finished stamper plate was about forty-four thousandths (.044) of an inch. The approximate curvature of the cross sectional profile of the equalizer or severance line groove as represented by an arc drawn in an axial plane of the tablet through the three points representing the bottom of the groove and the two edges of the groove, had a radius of about sixteen thousandths (.016) of an inch which will be seen to be considerably less than the thickness of the finished stamper plate, and therefore less than and sharper than could be produced by embossing the finished stamper plate.

It should be understood of course that the above illustration of specific values are only by way of example, and are not intended to represent limits to the applications of the invention.

When desired, a given thickness of stamper plate, such as that shown in Fig. 3 or the other figures, may be produced by soldering, cementing, or otherwise securing a relatively thin, electrolytically deposited negative copy of the original wax mold to a backing or foundation layer of suitable thickness to make up the total desired thickness for the finished stamper plate.

By omitting the spiral groove and the wave record contained therein, or omitting the wave record while keeping the spiral, and otherwise following the method and means disclosed herein, the invention may be employed for producing molds from which there may be pressed, wave record blank tablets suitable for the later reception of wave records on the faces thereof by well known methods of "home recording," or the like.

While the invention has been described as being particularly useful for making it practicable to press very thin records, it may also be used advantageously for pressing records of the more usual greater commercial thicknesses.

By cutting the equalizer defining groove 9 directly in the face of the original mold or a positive copy thereof, in definite fixed relation with the spiral groove, the various steps required for producing duplicate records from an original recording, are greatly simplified and an appreciable amount of time may be saved over that of previous methods, since there is no need of adjusting the height of a separate edge defining ring or of trying to correct for irregularities in the relation of the ring to the stamper. Furthermore, no intricate or difficult embossing operation is required. The resulting stamper is free from the irregularities of a stamper having an embossed ridge for defining the edge of the record disk, and is especially adapted for pressing very thin as well as thick record tablets, for regulating and equalizing the pressure of the plastic being pressed, for reducing the noise produced by thin disk records, especially near the border portions of the disk, and for providing a desired shape of profile for the edge of the tablet.

The fact that the thickness of the tablet 21 in the flat border zone, its weakened severance line, and its central disk portion, is substantially uniform along any arc in the flat faced part of the tablet coaxial with the zone or face, adds greatly to the efficiency of handling the tablet before removal of the border zone, and also facilitates efficient stripping of the zone from the disk at the desired time, this being of special importance for very thin records. By making the equalizer groove 16, which defines the severance line, of predetermined greater depth than the average depth of the record containing groove 3, the desired separation of the border zone from the central disk can occur only on the severance line, and undesired lines of cleavage are avoided.

By making the equalizer ridges in the stampers in accordance with the methods described herein, but omitting the flat border zone radially outside of the equalizer ridge, the advantages of the flat border zone are of course no longer obtained, but several advantages over prior methods and devices still remain. Among these are the advantage of avoiding irregularities in the height of the separate ring type of ridge or of the embossed type of ridge, the advantage of efficiently obtaining accuracy in the relation of the parts of the molds and tablets to permit of pressing very thin records of satisfactory quality as well as permitting of pressing records of the more usual greater thickness, the advantage of simplifying the method of production of the molds and tablets, and the advantage of saving time and reducing the cost of the molds and tablets.

While the invention has been disclosed as applied to several specific forms and methods of procedure which are considered desirable, it is adapted also for use in many and other widely different applications without departing from the invention as defined by the appended claims.

I claim:

1. A stamper mold for use in producing disk records, said mold having a flat circular face containing a spirally directed ridge including a wave record in portions thereof, said spiral ridge being coaxial with said face, and an equalizer ridge on said flat face coaxial with said spiral ridge and spaced radially outward from the record portions thereof and radially inward a predetermined distance from the outer edge of said face to provide a flat border zone of predetermined width between said ridge and said edge, said mold having a frusto-conical flange diverging directly from said outer edge and rearwardly from the record containing face of the mold.

2. A stamper mold for pressing thin disk records, said mold having a flat circular face containing an equalizer ridge coaxial with said face and spaced radially inward a predetermined distance from the outer edge of said face to provide a flat border zone of predetermined width between said ridge and said edge, and a flange coaxial with said equalizer ridge, said flange diverging directly from the outer edge of said flat mold face and in a direction rearwardly from said mold face.

3. A stamper mold for pressing thin disk records, said mold having a flat circular face containing an equalizer ridge coaxial with said face, and a frusto-conical flange coaxial with said equalizer ridge, said flange diverging directly from the outer edge of said flat mold face and in a direction rearwardly from said mold face.

JACKSON O. KLEBER.